(12) United States Patent
Silverman et al.

(10) Patent No.: US 6,501,644 B1
(45) Date of Patent: Dec. 31, 2002

(54) SHOCK MOUNT FOR HARD DISK DRIVE IN A PORTABLE COMPUTER

(75) Inventors: Ira J. Silverman, Sunnyvale; Ted Papadopoulos, San Jose, both of CA (US)

(73) Assignee: Fujitsu Personal Systems, Inc., Santa Clara, CA (US)

( * ) Notice: Subject to any disclaimer, the term of this patent is extended or adjusted under 35 U.S.C. 154(b) by 0 days.

(21) Appl. No.: 09/370,372

(22) Filed: Aug. 9, 1999

Related U.S. Application Data

(63) Continuation of application No. 08/904,070, filed on Jul. 31, 1997, now abandoned.

(51) Int. Cl.⁷ .................................................. G06F 1/16
(52) U.S. Cl. ...................... 361/685; 361/684; 361/686; 361/687; 361/704; 248/560; 248/636; 248/637; 248/638; 248/633
(58) Field of Search ................................ 361/684–686, 361/687, 704; 248/581, 609, 611, 612, 615, 632, 633, 638

(56) References Cited

U.S. PATENT DOCUMENTS

| | | | |
|---|---|---|---|
| 3,191,896 A | 6/1965 | Nathan | 248/22 |
| 3,436,042 A | 4/1969 | Van Goubergen | 248/22 |
| 4,002,315 A | 1/1977 | Van Goubergen | 248/24 |
| 4,436,274 A | 3/1984 | Kramer | 248/633 |
| 4,685,303 A | 8/1987 | Branc et al. | 62/3 |
| 4,896,777 A | 1/1990 | Lewis | 211/41 |
| 4,980,786 A | 12/1990 | O'Sullivan et al. | 360/97.03 |
| 5,041,924 A * | 8/1991 | Blackborow et al. | 360/69 |
| 5,216,582 A | 6/1993 | Russell | 361/395 |
| 5,337,998 A | 8/1994 | Nome | 248/634 |
| 5,349,486 A | 9/1994 | Sugimoto et al. | 360/97.01 |
| 5,366,200 A | 11/1994 | Scura | 248/632 |
| 5,402,308 A | 3/1995 | Koyanagi et al. | 361/395 |
| 5,426,562 A | 6/1995 | Morehouse et al. | 361/685 |
| 5,463,527 A | 10/1995 | Hager et al. | 361/685 |
| 5,478,058 A | 12/1995 | Tucchio et al. | 267/136 |
| 5,557,499 A | 9/1996 | Reiter et al. | 361/685 |
| 5,587,854 A | 12/1996 | Sato et al. | 360/97.01 |
| 5,673,171 A | 9/1997 | Varghese et al. | 361/685 |
| 5,704,212 A * | 1/1998 | Erler et al. | 62/3.2 |

FOREIGN PATENT DOCUMENTS

| | | | | |
|---|---|---|---|---|
| JP | 59-35504 | 9/1984 | | |
| JP | 3-241583 | 10/1991 | | |
| JP | 4-109484 | 4/1992 | | |
| JP | 4-349288 | 12/1992 | | |
| JP | 8-255471 | 10/1996 | | |
| JP | 8-293189 | 11/1996 | | |
| JP | 9-153277 | 6/1997 | | |
| WO | WO 96/19806 | * | 6/1996 | G11B/25/04 |

* cited by examiner

*Primary Examiner*—Darren Schuberg
*Assistant Examiner*—Lisa Lea-Edmonds
(74) *Attorney, Agent, or Firm*—Skjerven Morrill LLP; Norman R. Klivans

(57) ABSTRACT

A hard disk drive assembly for a portable computer includes a conventional small form factor hard disk drive which is mounted in a rigid housing; the housing is mounted to the portable computer chassis. The hard disk drive itself is shock and vibration protected from the housing by a set of thin shock pads of a shock absorbing material such as a viscoelastic polymer. The pads are e.g., 1 or 2 mm thick, typically no more than 5 mm thick. The pads are each relatively small in surface area and are interposed between all surfaces of the hard disk drive and the opposing surfaces of the housing, thereby suspending the hard disk drive in the housing with shock and vibration protection, without the shock pads themselves occupying a significant volume.

7 Claims, 5 Drawing Sheets

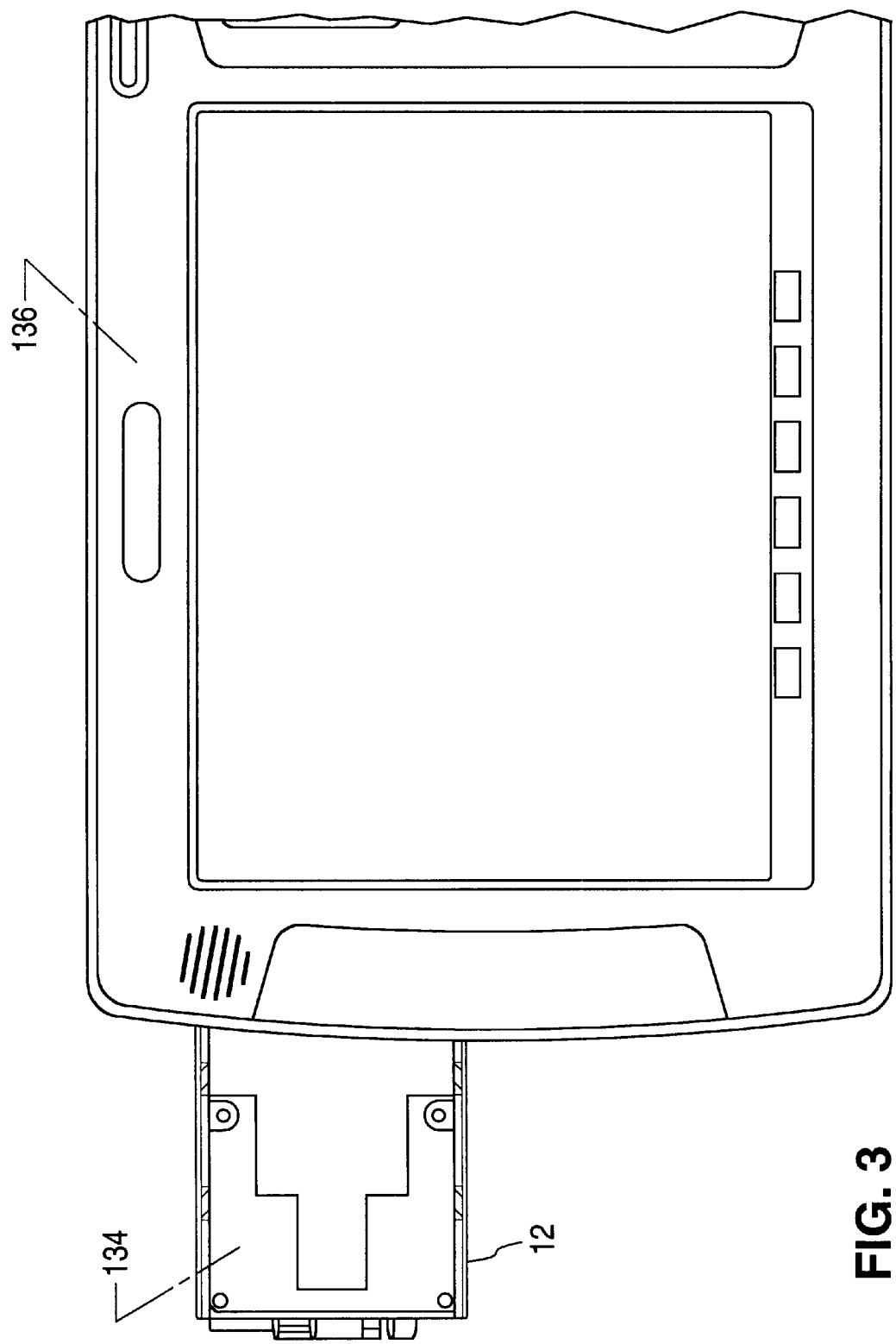

SHOCK MOUNT FOR HARD DISK DRIVE IN A PORTABLE COMPUTER

CROSS-REFERENCE TO RELATED APPLICATIONS

This is a continuation of application Ser. No. 08,904,070, filed Jul. 31, 1997 now abandoned entitled Shock Mount For Hard Disk Drive In A Portable Computer, by Ira Silverman and Ted Papadopoulos.

BACKGROUND

1. Field of the Invention

This invention relates to disk drives and personal computers, and more specifically to a shock mounting for a hard disk drive in a portable computer.

2. Description of the Prior Art

Personal computers are well known, as are portable personal computers, hereinafter referred to as portable computers. Most portable computers now sold include a hard drive disk drive (Winchester disk drive). A typical "form factor" for hard disk drives currently used in portable computers is two and a half inches, meaning the nominal diameter of the disk is two and a half inches. The typical overall size of such a hard disk drive is approximately four inches by three inches by one-half inch. In a portable computer, the hard disk drive is usually the component most sensitive to shock and vibration since it is the only rotating component, and it is mechanically complex. In use, the disk in the hard disk drive rotates at a high speed and a read/write head rides very closely above the disk. The head/disk arrangement is very sensitive to both vibration and shock and is easily damaged by either.

A typical shock parameter for a portable computer is that the portable computer can be dropped six inches onto a hard surface (e.g. table top) and that the hard disk drive itself sustains a maximum of 100G acceleration. It is to be understood that the hard disk drive itself is mounted within some sort of housing, typically metal and/or plastic, which is attached to the chassis of the portable computer.

To limit the shock to the hard disk drive to 100G, a typical prior art solution is to swathe the entire hard disk drive in a thick layer of very soft (polymer gel) material. This has the advantage of providing shock protection due to the softness of the material, and also eliminating transmission of vibration to the hard disk drive since gel dampens vibration. While effective, this approach has the drawback that the polymer gel material must be fairly thick, e.g. ⅜ inch thick or more. This is a significant problem, especially with the smaller types of portable computers where internal volume is at a premium. In this case, the shock mounting material undesirably occupies more volume than does the hard disk drive itself inside the computer.

Also, of course, such shock mounting material is typically thermally insulative. This may be a problem since the hard disk drive includes a rotational drive motor and a head motor which generate heat which must be dissipated. Hence, this prior art solution, while effective in terms of shock and vibration isolation, is far from ideal in terms of portable computer system design. An improved shock mounting system which would be highly desirable would consume less volume and also not be thermally insulative.

SUMMARY

In accordance with this invention, a hard disk drive is shock mounted within a housing in a portable computer. The shock mounting is a number of thin shock pads each having a small surface area. The shock pads are e.g. one or two millimeters thick, typically no more than five millimeters thick. Each shock pad is a shock absorbing material such as a viscoelastic polymer. The shock pads are collectively fairly small in surface area, e.g. 20% or less of the total surface area of the main top and bottom surfaces of the hard disk drive are covered by the shock pads. Most of the space between the outer surface of the hard disk drive and the inner surface of the housing is empty, or it may be used in one embodiment for installation of thermally conductive pads to provide an efficient heat path between the hard disk drive and e.g. the housing for heat dissipation.

These shock pads provide optimum shock and vibration isolation compared to that in the prior art, but occupy only an insignificant amount of volume since the shock pads are thin. The actual surface area of the shock pads and their thickness is determined so as to provide sufficient shock isolation while also minimizing amplification of resonant frequency vibrations to the hard disk drive from the portable computer.

Hence, the actual thickness and surface area of the shock mount is dependent upon the size and mass of the hard disk drive, as well as any resonant frequencies from which the hard disk drive must be protected.

This shock mounting is compatible with the usual sorts of housings for hard disk drives. For instance, in one embodiment the housing is a rigid box consisting of a bottom tray portion and a covering lid portion in which the hard disk drive fits. The shock mount pads are disposed between the inner surface of the housing and the outer surface of the hard disk drive. This housing in turn slides inside the portable computer on rails which are mounted on the portable computer chassis.

In another embodiment, the housing tray is mounted inside the portable computer on the chassis. The hard disk drive fits inside the tray and is isolated therefrom by shock pads. A cover fits over the hard disk drive and is also isolated from the hard disk drive by additional pads. This cover in turn is part of an outer surface of the portable computer. Of course, other types of housing are compatible with the present shock pad structure.

Also, while the presently disclosed shock mounting is directed to a hard disk drive, it is not so limited. As will be readily understood by one skilled in the art, in addition to hard disk drive, this scheme may be used with a floppy disk drive or with other types of disk drives. Of course, in the floppy disk (or other replaceable disk) drive embodiment, the front surface of the disk drive must be exposed through the outer housing of the portable computer. Otherwise the structures and methods disclosed herein for shock mounting are applicable to other than hard disk drives and also are not limited to the portable computer environment.

BRIEF DESCRIPTION OF THE DRAWINGS

FIG. 3 shows a disk drive assembly having a cover which is a portion of the outer housing of the portable computer.

DETAILED DESCRIPTION

Figure 1:
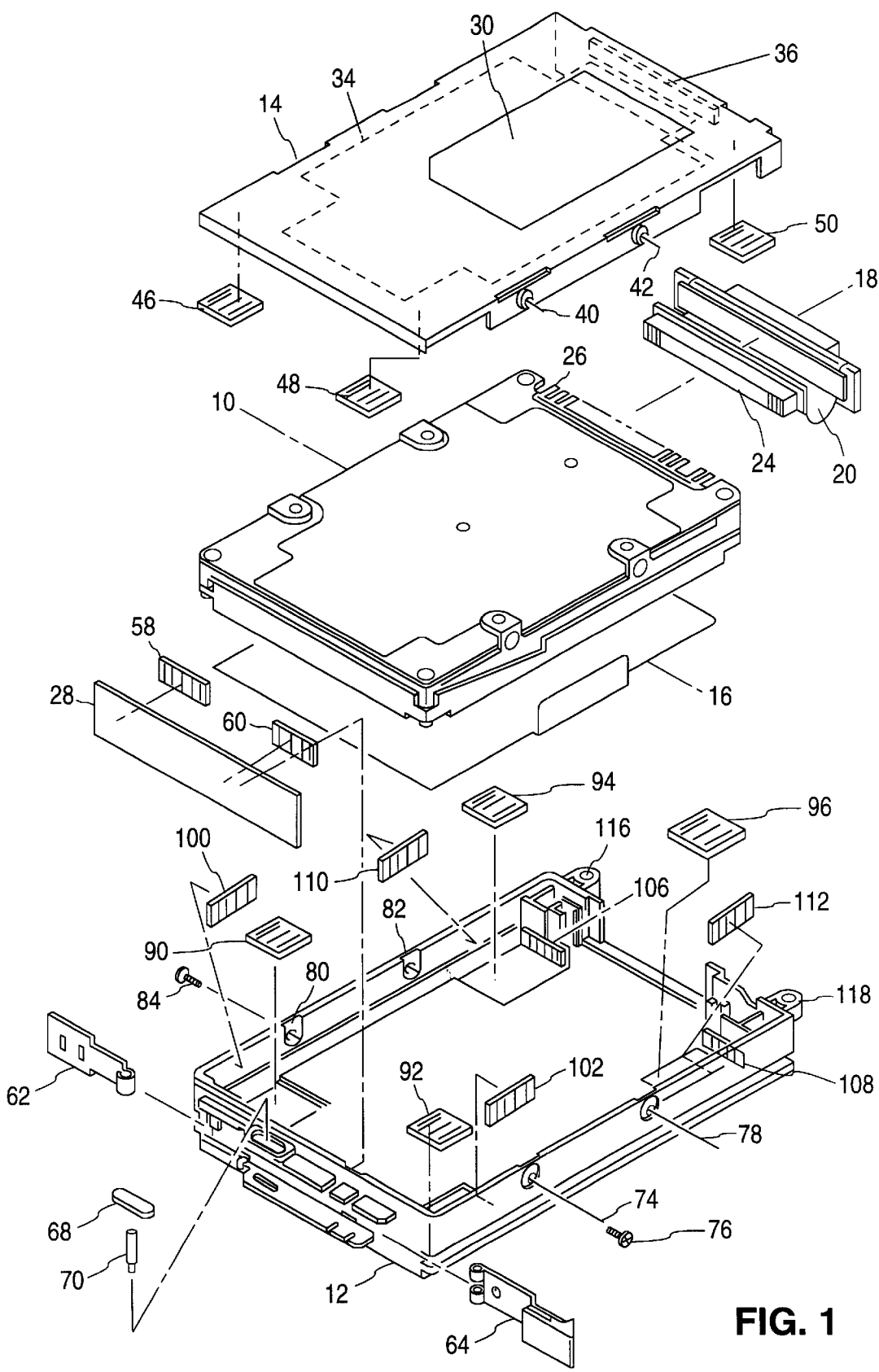
FIG. 1 shows an exploded view of a disk drive assembly in accordance with this invention.

FIG. 1 shows an exploded (disassembled) perspective view of a disk drive assembly in accordance with this invention. The associated portable computer is not shown; see FIG. 2 for this. It is to be understood that FIG. 1 is somewhat simplified because it does not show all conventional details of the depicted structures, but only the relevant elements. In addition, while a particular embodiment is shown here, this is not intended to be limiting. Many of the construction details disclosed herein are conventional and are subject to modification. Hence, the presently disclosed embodiments are illustrative and not limiting. Also, the particular dimensions and materials described herein are, in general, not limiting but are intended to be illustrative. Hence while the presently disclosed embodiments are for a particular size and mass hard disk drive this is not limiting; in the future hard disk drives may be of other sizes and shapes, and the present shock mounting in general is applicable to changes in the disk drive and the housing.

Moreover the disclosed details of the shock pads and their location and surface areas are only illustrative and are intended to provide a certain amount of shock and vibration protection; if greater or lesser amounts of shock or vibration protection are needed, the size, thickness and location of the shock pads would be changed, as will be readily understood by one of ordinary skill in the art.

FIG. 1 shows the hard disk drive 10 which is a commercially available type disk drive. The illustrated disk drive is a 2½ inch form factor hard disk drive but this is not limiting; other form factors are possible. Also, the disk drive may be in other embodiments a floppy disk drive or other type of disk drive. The details of hard disk drive 10 are not illustrated nor are any of its internal components shown since they are hidden from view and are conventional.

In the lower portion of the drawing, the next major structure is the tray 12 which in this case is the lower portion of the housing, cooperating with the upper portion of the housing, which is the cover 14. (The references to upper, lower, etc., are only with reference to the drawing and have no operational significance, since the disk drive may operate in any attitude and may be mounted in the personal computer in a variety of attitudes.) In this embodiment the tray 12 is, e.g. molded plastic and the cover 14 is e.g., sheet metal, but this is not limiting. It is to be understood that when assembled, all of these components are assembled together into a single structure.

Shield 16 is a thin piece of conductive material e.g. aluminum, which serves as an RF shield.

At the right hand portion of hard disk drive 10 its electrical connection 18 is a plug which electrically connects to the other portions of the portable computer via flexible cable 20 which connects to a second connector 24 which in turn plugs into pins 26 on the outside of the hard disk drive 10.

At the left hand side of the hard disk drive 10 there is a spacer of e.g. plastic 28. As can be seen, spacer 28 fits against the left hand inner edge of the tray 12. (The spacer 28 is not a necessary part of the structure.)

Structure 30 is only a label on the cover 14. The cover 14 also includes insulator structure 34. Opening 36 in the right hand edge of cover 14 accommodates the electrical connector 18. The right hand side of the cover 14 includes screw holes 40 and 42.

For purposes of clarity, the actual shock pads are shown hatched. Those shock pads which have a horizontal orientation (with respect to the drawing) have horizontal hatching whereas those shock pads which have a vertical orientation (with respect to the drawing) have vertical hatching. Illustrated in the upper portion of FIG. 1 are three horizontally oriented shock pads 46, 48, and 50; a fourth such shock pad is not shown because it is not visible in the drawing; it is located in the upper right hand corner of cover 14. In the assembled disk drive assembly, these shock pads 46, 48, 50 are captured between the inner surface of cover 14 and the corresponding upper outer surface of hard disk drive 10, with one shock pad located in each corner of cover 14. This corner arrangement is not limiting, other positions are possible.

To give an idea of dimensions, a 2 ½ inch form factor hard disk drive is 100 millimeters long and 70 millimeters wide and 13 millimeters thick, and weighs approximately 150 grams. Therefore in this embodiment the corresponding inner dimensions of the cover 14 and tray 12 are approximately the same, but slightly larger in order to accommodate both the hard disk drive and the shock pads. In this case shock pads 46, 48, 50 are each 15 millimeters long by 10 millimeters wide by 2 millimeters thick, and of a viscoelastic polymer which is a commercially available shock absorbing material. Such material is available in a variety of thicknesses. Examples of suitable viscoelastic polymer materials are Sorbothane from the Sorbothane Company, rubber materials of the type available from the E.A.R. Co., and a Japanese sourced material, similar to Sorbothane, called Sorbo.

In this case the shock pads are provided with adhesive on one surface so that they readily adhere in a permanent fashion to the inner surface of cover 14. The shock pads alternately are adhered to the outer surface of the hard disk drive 10. Since sorbothane is somewhat sticky by itself, in other embodiments no such adhesive is needed and the shock pads are merely placed between the cover 14 and hard disk drive 10 and kept in place by pressure. It has been understood that when assembled, cover 14 and tray 12 hold the hard disk drive between them in fixed fashion with the only contact between the cover 14 and the hard disk drive 10 being via the various shock pads. The same is true of the contact between hard disk drive 10 and the tray 12. Thereby the shock pads provide shock and vibration protection for hard disk drive 10.

In the center portion of FIG. 1, vertically arranged shock pads 58 and 60 are interposed between the inner surface of spacer 28 and the corresponding surface of hard disk drive 10 in order to isolate hard disk drive 10 from the spacer 28. The spacer 28 is in intimate contact with the corresponding inner surface 5 of tray 12. Of course in other embodiments no such spacer is required.

With regard to the lower portion of FIG. 1, there are several structures which are part of the housing and are shown merely for illustration. These structures include two latch parts 62 and 64 which latch the hard disk drive assembly into the personal computer. As can be seen, latch pawl 62 fits into the 64 slides latch panel 62 into the housing. Latch handle 64 slides latch pawl 62 in and out, to allow the disk drive assembly to be removed from the portable computer as needed. The latch is fastened by latch hardware 68 and 70.

Also shown in tray 12 are screw holes 74 and 78. Hole 74 is shown with its associated screw 76; the screw associated with screw hole 78 is not shown. In the left hand portion of tray 12 are screw holes 80 and 82 with the associated screw 84 for screw hole 80. There is of course a screw associated with screw hole 80. It is to be understood that when assembled, screw hole 40 is coaxial with screw hole 74 and screw hole 42 is coaxial with screw hole 78. There are corresponding screw holes in the left hand portion of cover 14 which are respectively coaxial with screw holes 80 and 82. Thereby the screws 84, 76 etc., assemble together the housing.

With reference to the tray 12, in this embodiment four shock pads 90, 92, 94 and 96 are horizontally mounted at respectively each inner corner of tray 12.

Eight vertically mounted shock pads are associated with tray 12, including shock pads 58, 60. The other six shock pads are, at the left hand portion of tray 12, shock pads 100 and 102, and at the right hand portion of tray 12, shock pads 106 and 108 which are on the right hand inner surface of tray 12, and shock pads 110 and 112 which are located on the same surface as shock pads 100 and 102. Shock pad 108 is not readily visible in FIG. 1 and hence is shown partly in dotted line. For purpose of illustration, shock pads 106 and 108 are shown in their assembled position, while all the other shock pads are shown in a disassembled position.

Rings 116 and 118 in FIG. 1 may be used for mounting the disk drive housing to the portable computer chassis by screws. These are not an essential portion of this structure since other mounting arrangements are possible.

The dimensions of the horizontally mounted shock pads 90, 92, 94 and 96 are the same as that of the horizontally mounted shock pads 46 etc.; this is not limiting. The vertically mounted shock pads 100, 102, 106, 108, 110, 112 in FIG. 1 are in this embodiment 15 millimeters long by 10 millimeters wide by 1 millimeter thick.

Thus it can be seen for instance that with reference to shock pads 46, 48, 50, that each of these has a surface area of 150 square millimeters for a total shock pad surface area of 600 square millimeters. (The fourth shock pad in this group is not illustrated.) This is in contrast to the approximately 7,000 square millimeters which is the surface area of the upper surface of hard disk drive 10. Thus in this example less than 10 percent of the surface area of the top of hard disk drive 10 is actually in contact with shock pads. This has been found to provide optimum vibration protection; that is, if there were more shock pads or the shock pads were larger, undesirable resonant frequencies are amplified by the shock pad arrangement, disturbing operation of the hard disk drive.

It is to be understood that the particular arrangement of shock pads shown in FIG. 1 is not limiting. The arrangement is a matter of design considerations depending on the configuration of the particular housing, the size of the hard disk drive, the mass of the hard disk drive, and any resonant frequencies to which the hard disk drive is to be exposed. Also of course the thickness of the shock pads is dependent on the amount of shock to be sustained. This particular shock pad arrangement is intended to limit shock transmitted to the hard disk drive 10 to 100G when the portable computer is dropped from 6 inches onto a hard surface.

Therefore the present shock mounting system is a trade-off of vibration vs. shock protection. While equal or better shock protection would be provided by more completely enclosing the hard disk drive in the viscoelastic polymer, this has been found undesirably to result in excessive amplification of vibration, due to the thinness of the present shock pad materials.

One particular viscoelastic polymer used here for the shock pads has a durometer measurement (hardness) of 50 shor A. Again this is not limiting. Other shock absorbing materials may require different configurations of the shock pads in terms of thickness and surface area.

Figure 2A:
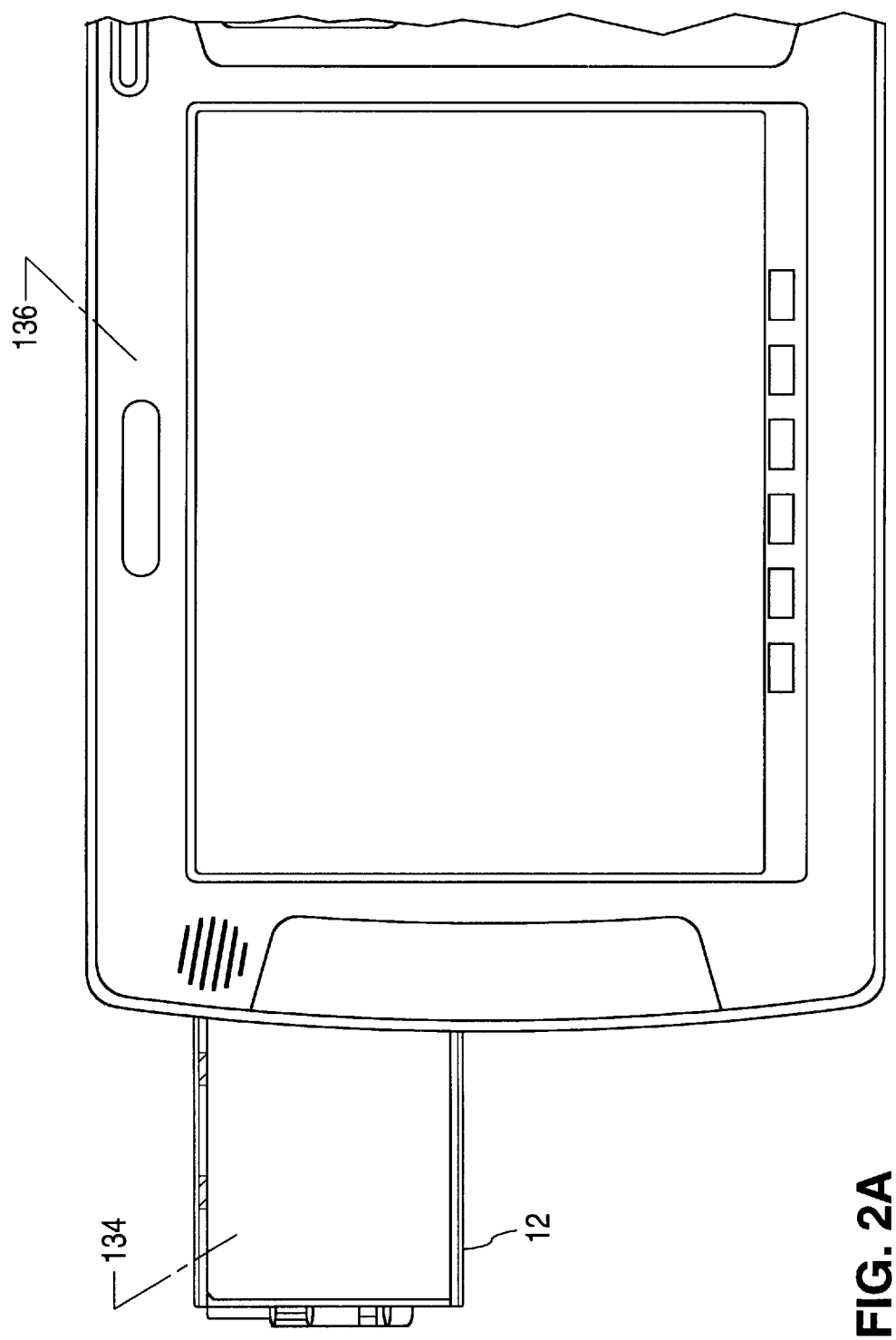
FIGS. 2A, 2B show the disk drive assembly of FIG. 1 as it is being installed into a portable computer.
Figure 2B:
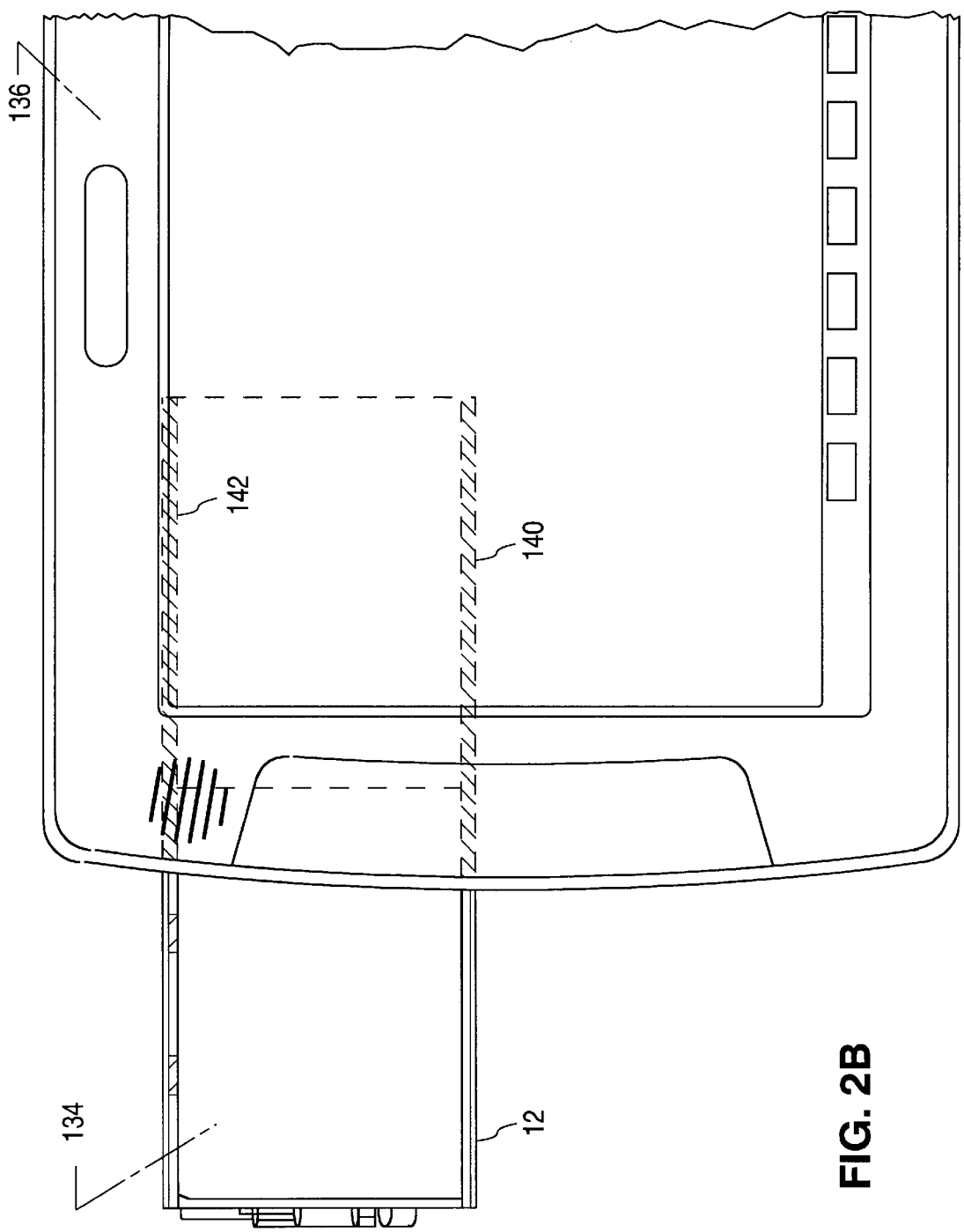
Figure 4:
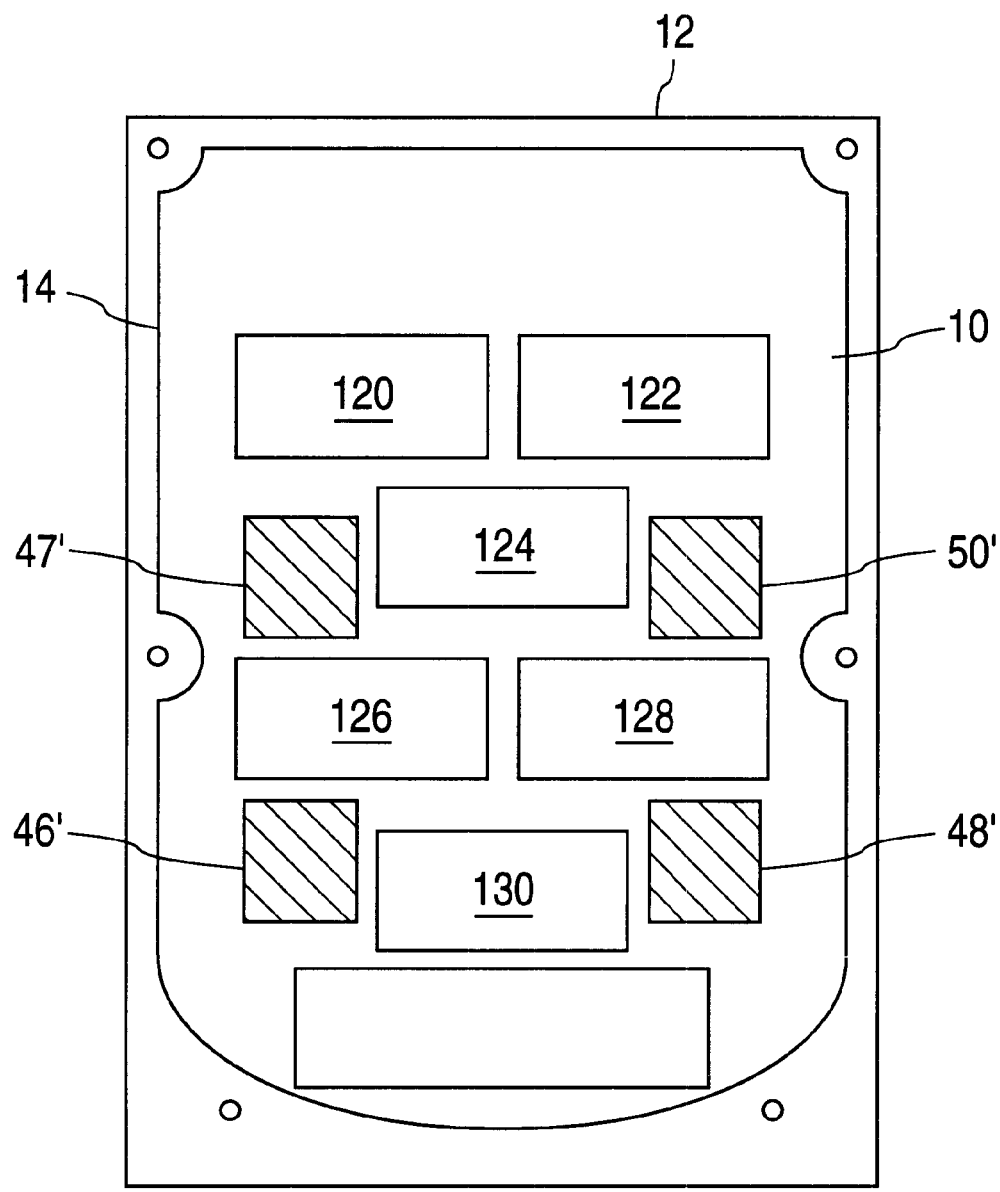
FIG. 4 shows use of heat conductive pads in accordance with this invention in a disk drive assembly.

FIG. 2A shows in a top view the hard disk drive assembly 134 of FIG. 1 in the process of being inserted into a portable computer 136. Shown in detail in FIG. 2B (dotted lines) are the rails 140, 142 mounted upon the chassis of the portable computer and upon which the outer surface of the hard disk drive assembly tray 12 rides. FIGS. 2A, 2B show how the housing of FIG. 1 is used in a particular portable computer and hence are only illustrative.

A housing differing somewhat in its mounting arrangement from that of FIG. 1 is used in other embodiments. For instance, in one embodiment the tray (or equivalent structure) instead of sliding on rails on the portable computer is permanently installed in the portable computer, e.g., mounted to the portable computer chassis. In this case in order to provide access to the hard disk drive (which is often removed for service or replacement due to its relative fragility), the cover 14 is typically a portion of the outer housing of the portable computer. Hence the cover 14 is removable, allowing access to the hard drive which may be easily removed from the tray 12. In this case, there are no rails but otherwise the arrangement is similar to that of FIG. 1, with the exception that latch elements 62, 64, etc. are not needed. The present shock mount is also applicable to permanently mounted disk drive housings and to permanently mounted hard disk drives.

The FIG. 1 arrangement is improved upon in accordance with yet another embodiment of the invention illustrated in FIG. 3. This embodiment is for use in relatively high heat environments, e.g. portable computers having high performance microprocessors which tend to be hot inside. In this case an additional structure is provided to remove heat from the hard disk drive, because in this case the air circulation between the housing and the hard disk drive itself is not adequate for heat removal.

Therefore in this case as shown in a top view in FIG. 3, additional heat conductive structure is provided. FIG. 3 is a top "x-ray" view of the assembled hard disk drive assembly showing structures which would normally not be visible; only pertinent structures of FIG. 1 are shown, for simplicity. The structures shown in FIG. 3 are generally the same as in FIG. 1 except for heat conductive pads 120, 122, 124, 126, 128, 130 which are co-planar with shock pads 46', 47', 48' and 50' and are of approximately the same thickness as the shock pads, and thereby in contact with both the upper surface of hard disk drive 10 and the inner surface of cover 14. Note that shock pads 46', 47', 48', 50' are in somewhat different locations than are corresponding shock pads 46, 48, 50 in FIG. 1. This illustrates one possible variation in the shock pad arrangement.

Unlike the shock pads, heat conductive pads 120, 122 etc. are of a heat conductive material. However, they may have no particular shock or vibration isolation properties, but serve only to conduct heat from the hard disk drive 10 to for instance the (metal) cover 14 which thereby acts as a heat sink. The actual surface area and shape of the heat conductive pads 120, 122 etc. is determined by how much heat conduction is needed. Again, the arrangement shown in FIG. 3 is only one illustrative embodiment of the heat conductive pads. The heat conductive pads may instead be located between the hard disk drive 10 and the tray 12 where the tray 12 is a heat conductive structure, or where a heat sink is provided on the inner surface of tray 12.

One advantage of the arrangement of FIG. 1 is that there is indeed space for air to flow between hard disk drive 10 and cover 14 and tray 12 since the total surface area of the shock pads is limited. This is a substantial improvement over the prior art where the hard disk drive is swathed in the shock absorbing material, which thereby undesirably also serves as a thermal insulator.

The presently disclosed embodiments are illustrative and not limiting; further modifications will be apparent to one skilled in the art in the light of this disclosure and are intended to fall within the scope of the appended claims.

What is claimed is:

1. A shock mounted disk drive assembly comprising:

a disk drive;

a housing for the disk drive, the housing being for mounting in a portable computer;

a plurality of shock pads suspending the disk drive in the housing, each shock pad being of a shock absorbing material and wherein the disk drive has rectangular top and bottom surfaces, and there is at least one shock pad in contact with the top surface of the disk drive and an inner surface of the housing near each corner of the top surface, and there is at least one shock pad in contact with the bottom surface of the disk drive and an inner surface of the housing near each corner of the bottom surface; the shock pads near each corner of the top surface being spaced apart from the shock pads at the other corners of the top surface, the shock pads near each corner of the bottom surface being spaced apart from the shock pads at the other corners of the bottom surface; and at least one thermally conductive pad disposed between a surface of the disk drive and the inner surface of the housing, the housing being for mounting in a portable computer, the housing comprising a tray mounted on the portable computer and an associated cover, the associated cover being a portion of an outer surface of the computer, and the tray being adapted to slide onto the mounting rails in the computer.

2. The assembly of claim 1, wherein each shock pad is no thicker than 2 mm.

3. The assembly of claim 1, wherein the shock pads in contact with each of the top and bottom surfaces collectively occupy no more than 10% of an area of each of the top and bottom surfaces.

4. The assembly of claim 1, wherein the shock pads are of a viscoelastic polymer.

5. The assembly of claim 4, wherein the shock pads are of Sorbo, Sorbothane, or rubber.

6. The assembly of claim 1, wherein the shock pads are each adhered to at least one of the disk drive and housing.

7. The assembly of claim 1, wherein the thermally conductive pad is of a different material than are the shock pads.

* * * * *